Figure 1:
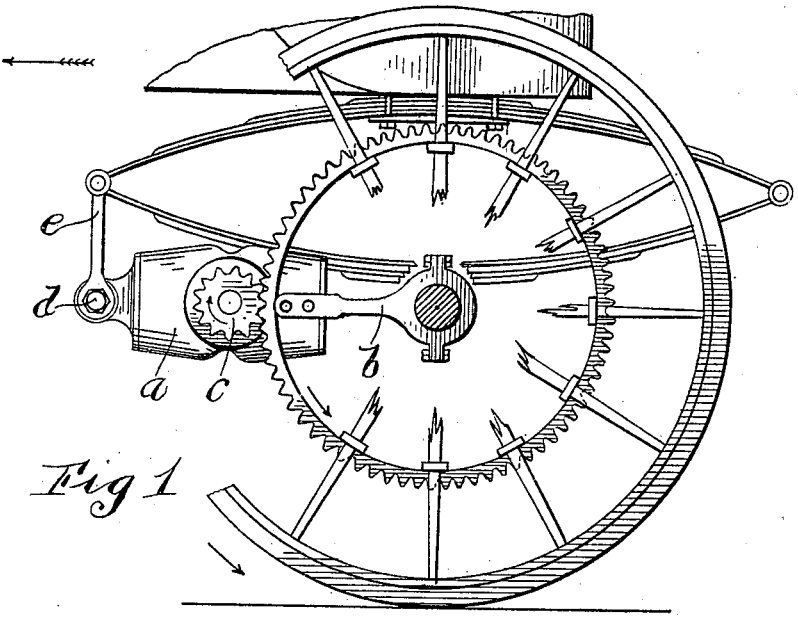

No. 619,527. Patented Feb. 14, 1899.
C. E. WOODS.
MOTOR VEHICLE.
(Application filed Mar. 5, 1898.)
(No Model.) 3 Sheets—Sheet 1.

Witnesses
George L. Cragg
D. H. C. Tanner

Inventor
Clinton E. Woods
By his Attorneys
Barton & Brown

No. 619,527. Patented Feb. 14, 1899.
C. E. WOODS.
MOTOR VEHICLE.
(Application filed Mar. 5, 1898.)
(No Model.) 3 Sheets—Sheet 2.
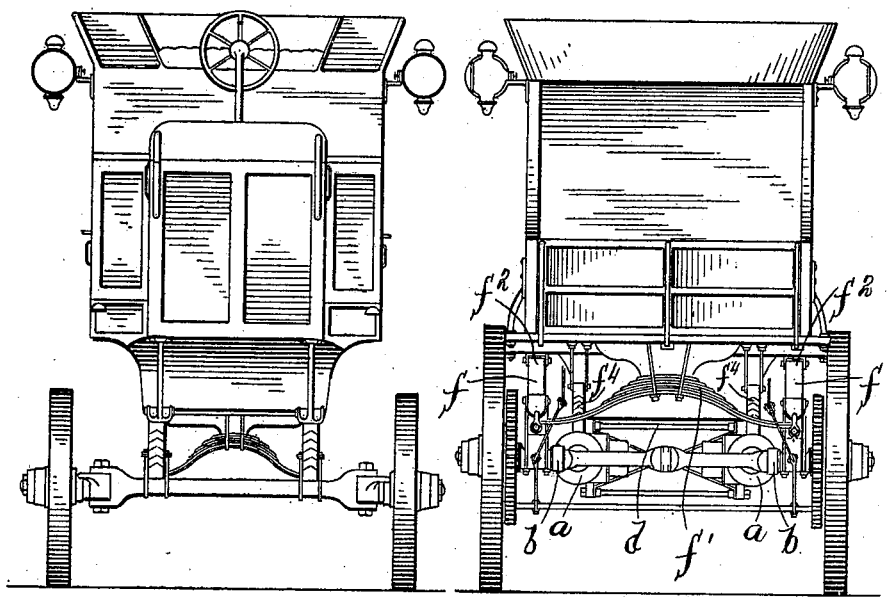
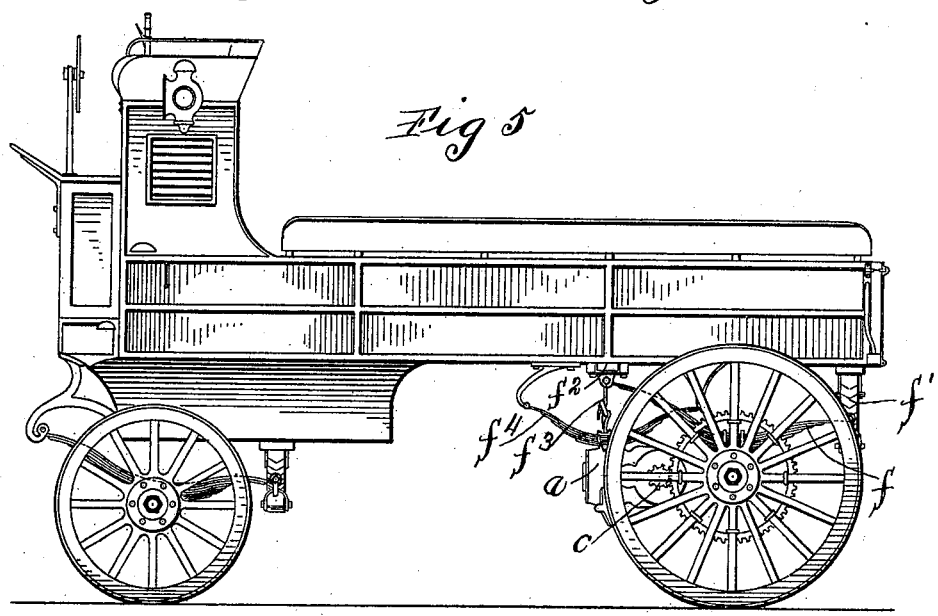

No. 619,527. Patented Feb. 14, 1899.
C. E. WOODS.
MOTOR VEHICLE.
(Application filed Mar. 5, 1898.)
(No Model.) 3 Sheets—Sheet 3.

Witnesses
George L. Cragg
D. H. C. Danner

Inventor
Clinton E. Woods
By his Attorneys
Barton & Brown

UNITED STATES PATENT OFFICE.

CLINTON E. WOODS, OF CHICAGO, ILLINOIS, ASSIGNOR TO THE FISCHER EQUIPMENT COMPANY, OF SAME PLACE.

MOTOR-VEHICLE.

SPECIFICATION forming part of Letters Patent No. 619,527, dated February 14, 1899.

Application filed March 5, 1898. Serial No. 672,701. (No model.)

*To all whom it may concern:*

Be it known that I, CLINTON E. WOODS, a citizen of the United States, residing at Chicago, in the county of Cook and State of Illinois, have invented a certain new and useful Improvement in Vehicles, (Case No. 5,) of which the following is a full, clear, concise, and exact description.

My invention relates to motor-propelled vehicles, and particularly to that class of vehicles, known as "motocycles," adapted for travel upon trackless roads, and has for its object the provision of an improved and simple construction for overcoming certain defects in vehicles of this class.

Heretofore railway motor-driven vehicles have been provided with one spring-mounting for the vehicle-body and a second spring-mounting for the motor, this construction being peculiarly adapted for low-hung vehicle-bodies not subject to great saltatory and rolling motion.

My invention herein consists in a motocycle having a spring support or supports adapted to subserve the double purpose of flexibly supporting the vehicle-body and motor, the motor being preferably provided, as in prior constructions, with a pivoted mounting at one end coaxial with the gear-wheel directly engaging the driving-wheel of the motor, the other end of the motor being united with the common flexible support.

In practicing my invention I preferably employ two motors for each vehicle, each rear wheel being geared to a motor independently of the other, whereby differential gearing is dispensed with. I employ elliptic springs in my preferred construction, one spring being associated with each motor and adapted to perform the double function of flexibly supporting the motor at one end and yieldingly supporting the carriage-body upon the running-gear.

In one embodiment of the invention I employ two full-elliptic springs, to one end of each of which an end of a motor is linked, the other end of said motor being rotatably mounted upon the rear or driving-shaft of the vehicle. The linked ends of the motors and the corresponding ends of the elliptical springs are united by brace-rods properly to preserve the relative disposition of the parts.

A second embodiment of my invention will be described hereinafter.

I will explain my invention more particularly by reference to the accompanying drawings, in which—

Figure 2:
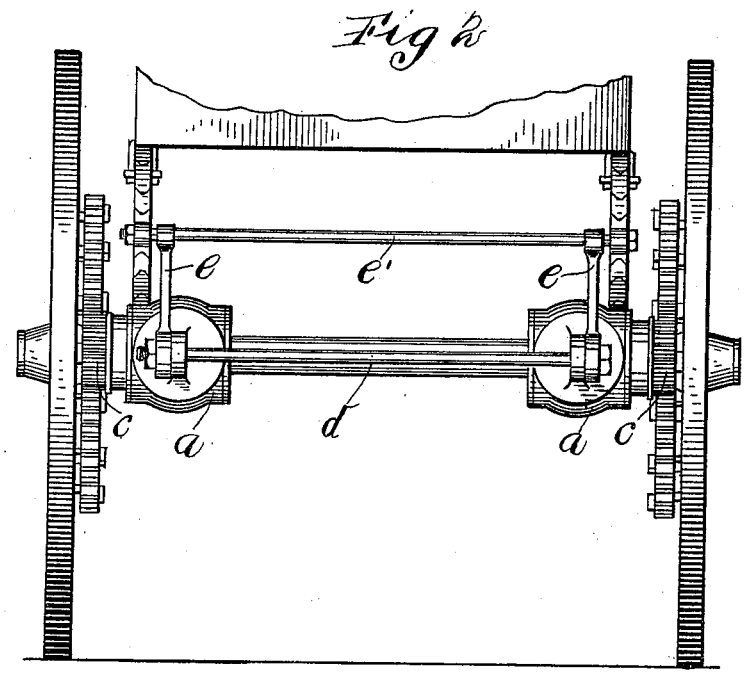
Figure 6:
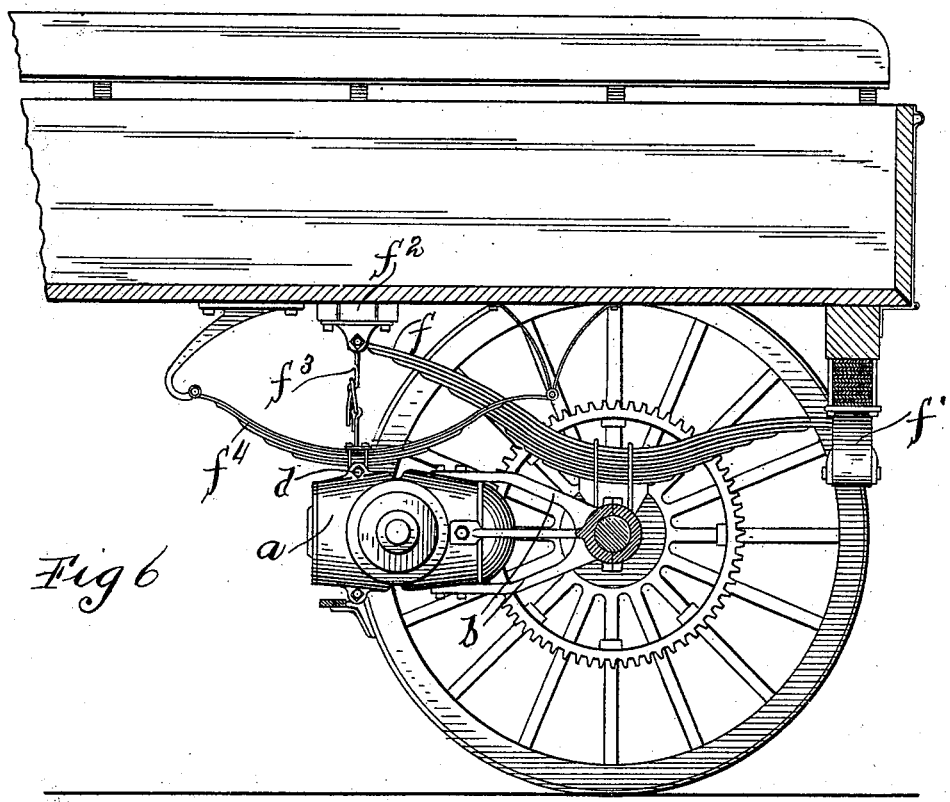
Figure 7:
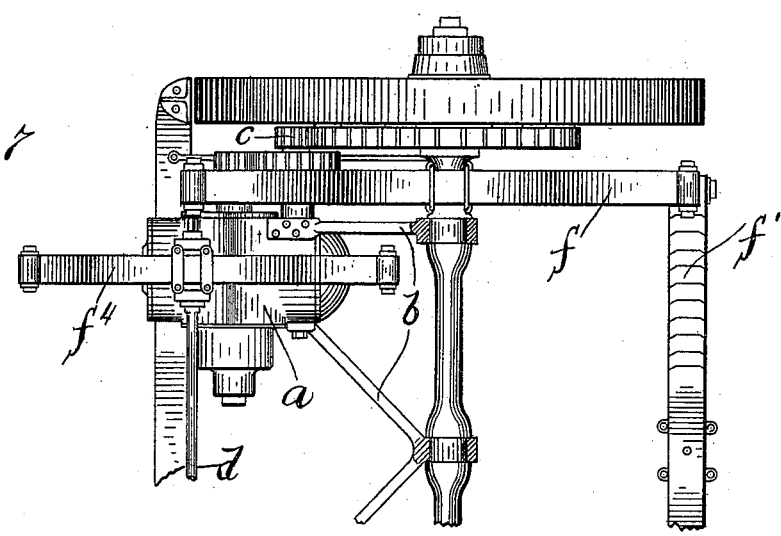

Figure 1 is a side elevation of the rear portion of a motocycle in the form of a light vehicle, as a carriage, constructed in accordance with my invention, parts being broken away to show more clearly the construction. Fig. 2 is a rear view of the apparatus shown in Fig. 1. Fig. 3 is a front elevation of a moto vehicle or truck, constructed in accordance with my invention, adapted to carry heavy loads. Figs. 4 and 5 are respectively rear and side elevations of the apparatus shown in Fig. 3. Fig. 6 is a detail side sectional elevation of the rear portion of the apparatus illustrated in Figs. 3, 4, and 5. Fig. 7 is a plan view of a part of the driving-gear shown in Fig. 6.

Like letters indicate like parts throughout the different views.

I preferably employ two suitable motors $a\, a$, those illustrated being electric motors inclosed within protecting cases. The motors have extensions $b\, b$, by which the motors are rotatably suspended upon the rear shaft. Each motor carries a spur driving-pinion $c$, engaging a corresponding driving-gear, in this instance mounted directly upon the shaft or adjacent rear wheel. A brace-rod $d$ is interposed between the motors, that shown in Figs. 1 and 2 being secured to the outer ends of the motors, while in the remaining construction it is secured to the tops of the motors near the outer ends.

In the construction illustrated in Figs. 1 and 2 two full-elliptic springs are interposed between the vehicle-body and the running-gear, the motors being united with the contiguous ends of the elliptic springs by links $e\, e$, a rod $e'$ uniting the springs and serving as a means of attachment for said links. By this construction of light vehicles I am enabled to employ a single elliptic spring in connection with each motor, which is adapted to permit the requisite wide range of motion of the vehicle-body upon its spring-support, the motor, while relying for its support upon the same spring that supports the vehicle-body, having a much smaller range of movement.

It is important to give the motor a spring mounting to prevent sudden impact or violent engagement between the cogs of the gearing, as when the vehicle is suddenly started ahead, stopped, or reversed, or when the vehicle-wheels strike ruts. Such a wide range of motion permitted to bodies of light vehicles would be objectionable if possessed by the motor. By attaching the motors to the ends of the elliptic springs, as shown, the vehicle body and motors may have the ranges of movement to which they are peculiarly suited.

With vehicles of heavy construction the range of motion of the vehicle-body is decreased and approaches more nearly the desired range of motion of the motor. In adapting my invention to heavy vehicles I preferably employ the construction shown in Figs. 3, 4, 5, 6, and 7. The rear portion of the vehicle is supported upon three semi-elliptic springs $f f f'$. The forward ends of the semi-elliptic springs $f f$ are attached to the wagon-body at $f^2 f^2$. The free ends of the motors are also attached to the wagon-body at $f^2 f^2$ by adjustable straps $f^3$, composed, preferably, of leather. Supplementary semi-elliptic springs $f^4 f^4$ are anchored to the wagon-body at their ends and at their intermediate portions to the motors. By this construction a direct downward pull is exerted by the motors upon the wagon-body through the medium of the straps $f^3$ when the motor is started to back the vehicle, this downward movement being resisted by the elliptic springs $f f$. When the motor is started to move the vehicle forward, the springs $f^4$ yieldingly limit the tendency of the motor to move upwardly. When the vehicle is suddenly stopped or when it strikes a rut, the elliptic springs will give to ease the motor. The motors are preferably firmly braced together, as illustrated, to maintain the motors in alinement.

In each case it will be observed that the motors are attached to the movable portions of those elliptic springs which are disposed between the vehicle-body and the driving-wheels of the vehicle, which wheels in the present instances are the rear wheels.

In the claims I speak of the free ends of the motors as being attached to the elliptic springs by a practically rigid link or connection, meaning that the portions that unite and are interposed between the motors and springs are sufficiently rigid in themselves to limit the upward movement of the motors.

In the claims I use the term "elliptic spring" when unaccompanied by a qualifying word, in the sense of a full-elliptic or semi-elliptic spring.

While I have shown and particularly described two embodiments of my invention, I do not wish to be limited to the precise construction shown; but,

Having thus described my invention, I claim as new, and desire to secure by Letters Patent, the following:

1. In a motocycle or vehicle, the combination with a vehicle-body, of a flexible support therefor composed in part of an elliptic spring interposed between the vehicle-body and the driving-wheels, and a motor in engagement with the running-gear of the vehicle and flexibly supported by a movable part of said elliptic spring, substantially as described.

2. In a motocycle or vehicle, the combination with a vehicle-body, of a flexible support therefor composed in part of an elliptic spring interposed between the vehicle-body and the driving-wheels, a motor, a gear-wheel engaging and adapted to rotate a wheel-shaft of the vehicle, a second gear-wheel upon the motor, the motor with its gear-wheel being mounted bodily to rotate about the axis of the second gear-wheel, said motor being attached by a practically rigid link or connection to a movable part of said elliptic spring, substantially as described.

3. In a motocycle or vehicle, the combination with a vehicle-body, of a flexible support therefor composed in part of two elliptic springs interposed between said body and a pair of driving-wheels, and two motors, each in engagement with a driving-wheel independently of the other and flexibly supported by a movable part of an elliptic spring, substantially as described.

4. In a motocycle or vehicle, the combination with a vehicle-body, of a flexible support therefor composed in part of a full-elliptic spring interposed between the vehicle-body and the driving-wheels, and a motor in engagement with the running-gear of the vehicle and secured at or near the end of said elliptic spring by a practically rigid link or connection, substantially as described.

5. In a motocycle or vehicle, the combination with a vehicle-body, of a flexible support therefor composed in part of two full-elliptic springs interposed between the vehicle-body and the driving-wheels, two motors, each having a gear-wheel, and two additional gear-wheels, one in engagement with each driving-wheel and one of the aforesaid gear-wheels, said motors being bodily mounted to rotate upon axes coincident with the axes of the second aforesaid gear-wheels, and each attached at or near one end of each of said elliptic springs by a practically rigid link or connection, substantially as described.

In witness whereof I hereunto subscribe my name this 28th day of February, A. D. 1898.

CLINTON E. WOODS.

Witnesses:
GEORGE L. CRAGG,
A. L. LAWRENCE.